United States Patent [19]
Takahashi et al.

[11] Patent Number: 4,662,533
[45] Date of Patent: May 5, 1987

[54] SAFETY VALVE DEVICE FOR ENCLOSED CELLS

[75] Inventors: Akira Takahashi, Hirakata; Yoshifumi Kudara, Higashiosaka; Sadao Shoji, Fujisawa; Saburo Nakatsuka, Kyoto, all of Japan

[73] Assignee: Matsushita Electric Industrial Co., Ltd., Osaka, Japan

[21] Appl. No.: 782,670

[22] PCT Filed: Jan. 18, 1985

[86] PCT No.: PCT/JP85/00016
§ 371 Date: Sep. 18, 1985
§ 102(e) Date: Sep. 18, 1985

[87] PCT Pub. No.: WO85/03386
PCT Pub. Date: Aug. 1, 1985

[30] Foreign Application Priority Data
Jan. 19, 1984 [JP] Japan .................................. 59-5933

[51] Int. Cl.4 .............................................. B65D 51/16
[52] U.S. Cl. .................................. 220/209; 220/203; 220/367

[58] Field of Search ....................... 220/209, 367, 203; 429/53, 54, 82; 137/516.15

[56] References Cited
U.S. PATENT DOCUMENTS
3,994,749 11/1976 Decker et al. ...................... 220/209

FOREIGN PATENT DOCUMENTS
1165899 10/1969 United Kingdom .

Primary Examiner—George T. Hall
Attorney, Agent, or Firm—Wenderoth, Lind & Ponack

[57] ABSTRACT

A safety valve device used for enclosed cells, in which safety valve device an elastic valve body, which has a cross section with not more than eight angles, is placed in a valve chamber formed between a cap type positive terminal and a dish type opening seal member. Owing to the above-described construction, the volume ratio of the elastic valve body to the interior of the valve chamber can be reduced to a low level. Moreover, the valve body is placed in the center of the interior of the valve chamber so as to seal a gas discharge port reliably, and minimize the variation of the safety valve operating pressure.

13 Claims, 15 Drawing Figures

SAFETY VALVE DEVICE FOR ENCLOSED CELLS

FIELD OF THE INVENTION

The present invention relates to a safety valve device for closed cells and more particularly it relates to a safety valve device wherein placed in a valve chamber formed between a cap serving as a positive or negative terminal and a dish type opening seal member centrally provided with a gas discharge hole is an elastic valve body whose volume is less than that of the valve chamber and which has a polygonal upper surface with not more than eight angles, said elastic valve body closing said gas discharge hole.

BACKGROUND ART

A closed cell, particularly a cylindrical Ni-Cd storage cell has been constructed generally in the form shown in FIG. 1. In the figure, a cap type positive terminal 1 and a dish type opening seal member 2 are formed of stainless steel sheet or nickel-plated steel sheet, and placed in a valve chamber 3 formed between the two is an elastic valve body 4 like a go stone having upper and lower symmetrical surfaces similar to a convex lens as shown in FIGS. 2A and 2B, said valve body being made of an alkali-resisting rubber, e.g., chloroprene rubber, ethylene propylene rubber, fluororubber or silicone rubber, the peripheral edge of said dish type opening seal member 2 being crimped to fix the cap type positive terminal 1 in position, thereby forming a safety valve device. When the pressure of the gas in a within-cell space 8 defined by a metal cell container 6 storing a cell element 5 and serving as the negative terminal of the cell, the safety valve device serving as the positive terminal of the cell and a resin ring 7 for isolating the positive and negative poles and hermetically sealing the container rises above a predetermined value, the gas pushes up the elastic valve body 4 previously closing a gas discharge hole 9 in the dish type opening seal member 2, and discharges outside passing through the valve chamber 3 and then through a gas discharge hole 9' in the cap type positive terminal 1. If the pressure in the cell container is thereby decreased below the predetermined value, the elastic valve body 4 closes the gas discharge hole 9 of the dish type opening seal member 2 again and keeps the closed cell sealed. The gas pressure in the within-cell space 8 which exists when the gas in the within-cell space has been discharged outside is called the safety valve working pressure, which must be lower than the deforming pressure for the cell container 6 but higher than the gas pressure which rises during normal use of the cell.

Usually, the upper limit of the safety valve is 30 kg/cm$^2$ and the lower limit 10 kg/cm$^2$, the pressure range being about 20 kg/cm$^2$, and it is necessary to set the safety valve working pressure in this range with less variation.

In the safety valve device described above, the valve chamber 3 is substantially filled with the elastic valve body 4, as shown in FIG. 1. FIG. 3 shows a characteristic obtained by changing the outer diameter a of the valve body shown in FIG. 2 to change the percentage of the volume occupied by the valve body in the valve chamber while making the height of the safety valve device substantially constant. As shown in this figure, it is seen that in the case where the percentage of the volume occupied by the elastic valve body in the valve chamber volume (hereinafter referred to as the valve body occupancy percentage) is high as usual, the safety valve working pressure changes greatly with a slight change in the volume of the elastic valve body, e.g., in the height of the elastic valve body.

The valve body occupancy percentage could be decreased by making the diameter a of the elastic valve body smaller than the valve body receiving section inner diameter b (hereinafter referred to as the valve body inner diameter) of the cap type positive terminal 1. However, simply making the diameter a smaller than the valve body receiving section inner diameter b would result in the elastic valve body being deviated from the center of the valve chamber; in this case, it sometimes happens that the cap type positive terminal is fixed without completely closing the gas discharge hole 9 of the dish type opening seal member 2. The safety valve working pressure in this case becomes lower than when the elastic valve body is positioned in the center of the valve chamber, forming a cause of an increased variation in the safety valve working pressure. FIG. 4 shows the relation between the ratio of the outer diameter a of the elastic valve body to the valve chamber inner diameter b, or the ratio a/b (in percentage), and the safety valve working pressure.

As is clear from the above description, with the conventional safety valve device it has been impossible to decrease the variation in the safety valve working pressure while decreasing the valve body occupancy percentage.

SUMMARY OF THE INVENTION

An object of the invention is to provide a safety valve device which eliminnates the aforesaid drawback, decreases the valve body occupancy percentage, and minimizes the variation in the safety valve working pressure.

The safety valve device of the invention comprises a valve chamber defined between a cap type positive terminal and a dish type opening seal member, and an elastic valve body having a polygonal upper surface with not more than eight angles, said elastic valve body being placed in said valve chamber so that the ratio (a/b) of the circumscribed circle diameter a of the valve body to the valve chamber inner diameter b is 90–105 percent. Preferably, the upper and lower surfaces of the valve body are curved and the angles are rounded. It is also preferable that the location where the gas discharge hole of the dish type opening seal member contacts the valve body is coated with a water-repelling non-drying sealing agent to prevent leakage of liquid. Further, the cap type positive terminal is fixed in position by crimping the peripheral edge of the dish type opening seal plate, and the safety valve working pressure is 10–30 kg/cm$^2$ with less variation in this range.

DETAILED DESCRIPTION OF THE PREFERRED EMBODIMENTS

The invention will now be described in detail with reference to the drawings showing embodiments of the invention in the form of a cyindrical enclosed Ni-Cd cells.

Figure 1:
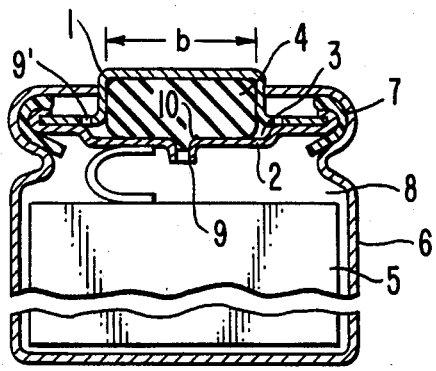
FIG. 1 is a sectional view of an enclosed cell with a conventional safety valve device.
Figure 7A:
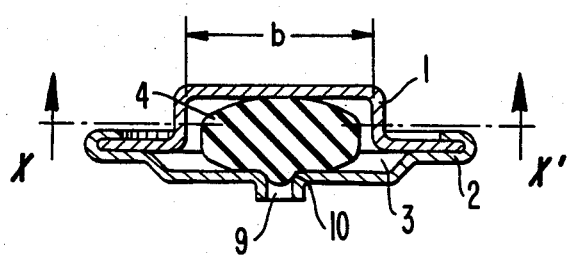
FIGS. 7A and 7B show an embodiment of a safety valve device of the invention, FIG. 7A being a front view, 7B being a cross-sectional view taken along the line X—X'.
Figure 7B:
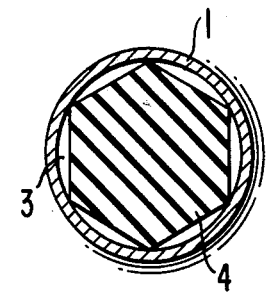
Figure 8A:
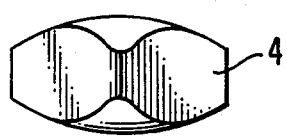
FIGS. 8A and 8B show an embodiment of an elastic valve body of the invention, Fig. A being a front view, B being a top view.
Figure 8B:
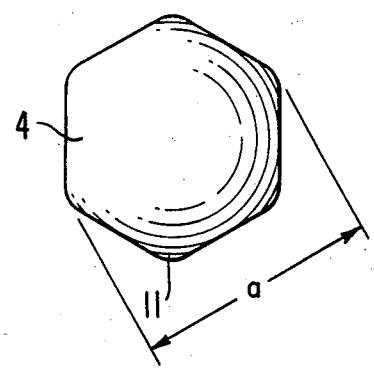

In FIGS. 7A and 7B, the numeral 1 denotes a cap type positive terminal, and numeral 2 denotes a dish type opening seal member centrally having a gas discharge hole 9 with a downwardly projecting sleeve formed by burring. These components are nickel-plated after drawing from steel sheet. The numeral 3 denotes a valve chamber formed between the cap type positive terminal 1 and the dish type opening seal member 2, and numeral 4 denotes an elastic valve body held in compressed condition in the valve chamber and having convexly curved upper and lower surfaces, the side surface being hexagonal in cross section. As is seen in FIGS. 8A and 8B, the upper and lower surfaces are spherical or uniform in radius of curvature and bounded by the upper and lower edges of the side surface. This safety valve device closes the opening in the cell container 6 having the cell element 5 housed therein as shown in FIG. 1. The numeral 10 denotes a non-drying sealing agent applied to the location where the periphery of the gas discharge hole 9 contacts the valve body 4, said sealing agent being a saturated hydrocarbon, such as paraffin, or an unsaturated hydrocarbon, having water repellency, and being preferably highly viscous, said agent being applied in an amount of about 3 mg to said location. The sealing agent 10 is applied to the extent that it slightly collects on the burred gas discharged hole 9, thereby preventing the electrolytic solution in the cell from leaking through the gas discharge hole 9.

Figure 9:
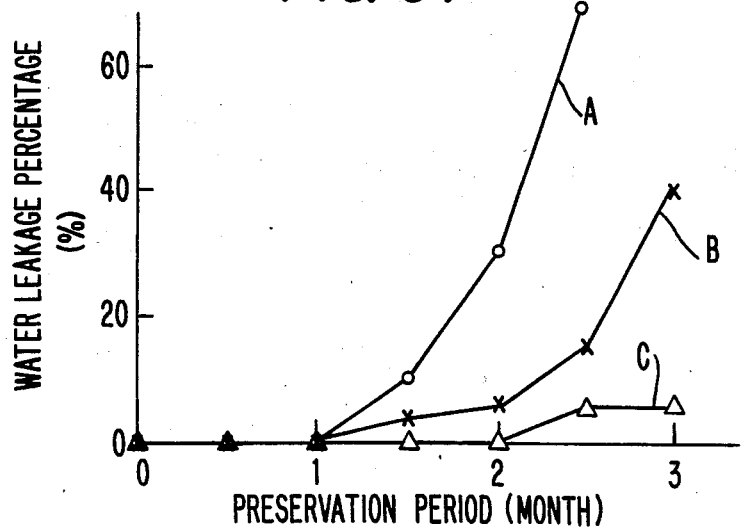
FIG. 9 is a graph showing the relation between preservation period and liquid leakage percentage.

The effect of applying this sealing agent to the gas discharge hole is shown in FIG. 9. FIG. 9 shows the relation between preservation period and liquid leakage percentage when the cell is preserved at a temperature of 35° C. and a relative humidity of 90-95%, wherein the curve A refers to the case where no sealing agent is applied, the curve B refers to the case where the sealing agent is applied without burring the gas discharge hole, and the curve C refers to the case where the gas discharge hole is burred and the sealing agent is applied so that it collects on the burred portion. In addition, in both curve B and curve C, the amount of sealing agent applied is 3 mg. As is clear from the figure, in the case represented by curve C causes the least leakage of liquid occurs.

In this example, during normal use, the gas pressure in the within-cell space 8 rises by about 5 kg/cm$^2$, for example, for 15 hours of charging at 0.1 CmA; thus, the valve working pressure for the safety valve device must be at least 5 kg/cm$^2$ or more. For this reason, using a safety factor of 2, it is set at 10 kg/cm$^2$ or more. Further, since the cell container 6 in this example will start deforming at 60 kg/cm$^2$, the upper limit of the valve working pressure is set at 30 kg/cm$^2$, the safety factor being 2.

To position the elastic valve body 4 in the middle of the valve chamber and to decrease the valve body occupancy percentage, it is only necessary to provide an elastic valve body having the irreducible minimum of volume and a guide portion adapted to position it in the middle of the valve chamber. As the simplest form therefor, we have found satisfactory a polygonal elastic valve body inscribed in a circle defining the outer diameter of the valve body.

Figure 5:
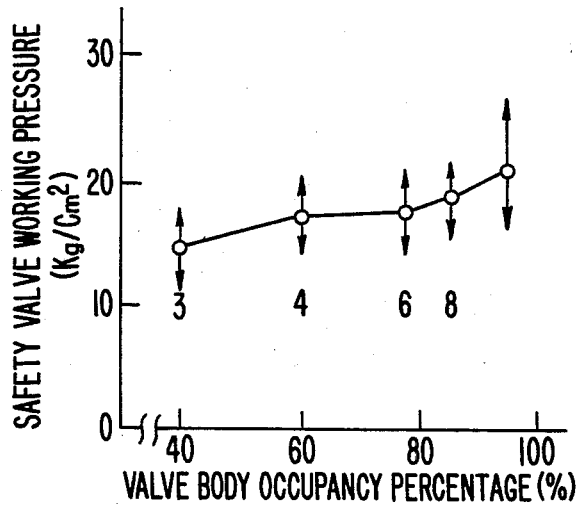
FIG. 5 is a characteristic diagram for various forms of elastic valve bodies of the present invention.

A characteristic for various forms of elastic valve bodies is shown in FIG. 5. Polygonals having more than eight angles are not suitable for the purpose of decreasing the valve body occupancy percentage since in this case the difference in volume from the conventional go stone-like elastic valve body is as small as 15%. Preferable forms range from a triangle to an octagon, in which case the valve body occupancy percentage is 40-85%.

Figure 6:
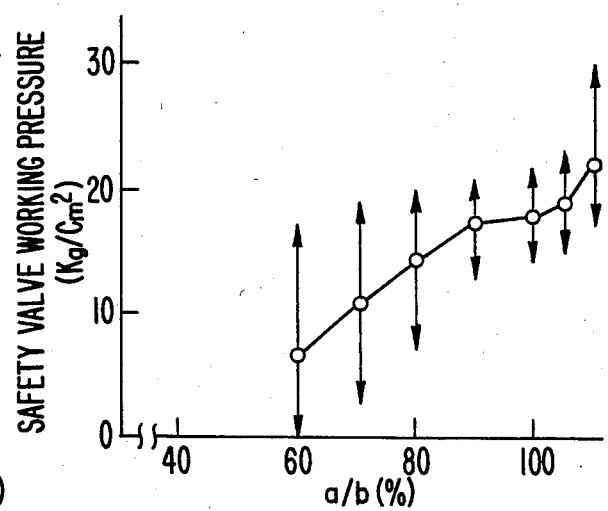
FIG. 6 is a characteristic diagram where the outer diameter of a hexagonal elastic valve body of the invention is changed.

The relation between the ratio of the circumscribed circle diameter a of the elastic valve body to the inner diameter of the valve chamber b and the safety valve working pressure is, in the case of a hexagonal valve body, as shown in FIG. 6. The safety valve working pressure is stable when a/b is 90-105%.

When a/b is greater than 105%, the valve body occupancy percentage is 85% or more and the variation in the safety valve working pressure increases. Reversely, if a/b is less than 90%, the safety valve body deviates from its proper position, thus increasing the variation.

Figure 2A:
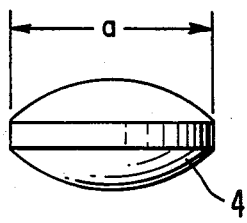
FIGS. 2A and 2B show a conventional elastic valve body, FIG. 2A being a front view, FIG. 2B being a top view.
Figure 2B:
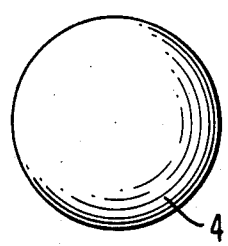
Figure 3:
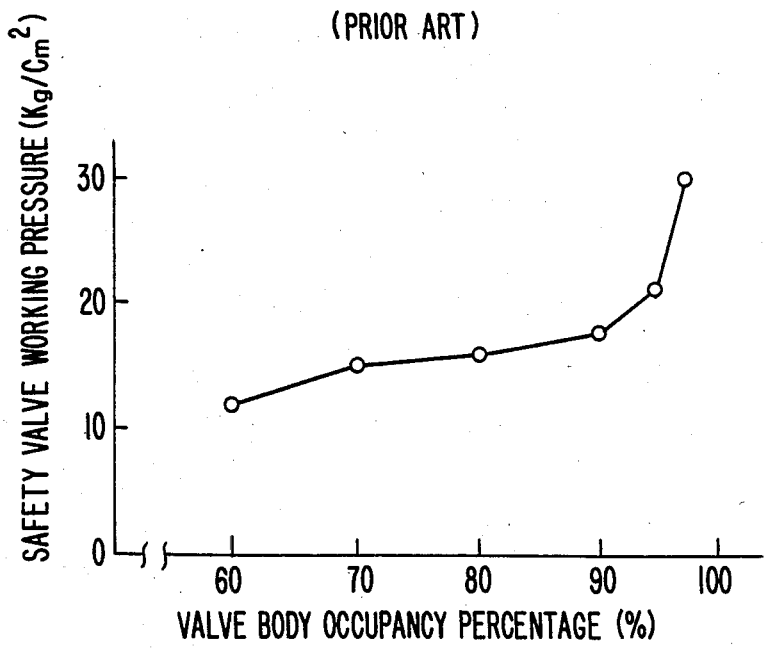
FIG. 3 is a characteristic diagram of the conventional safety valve device.
Figure 4:
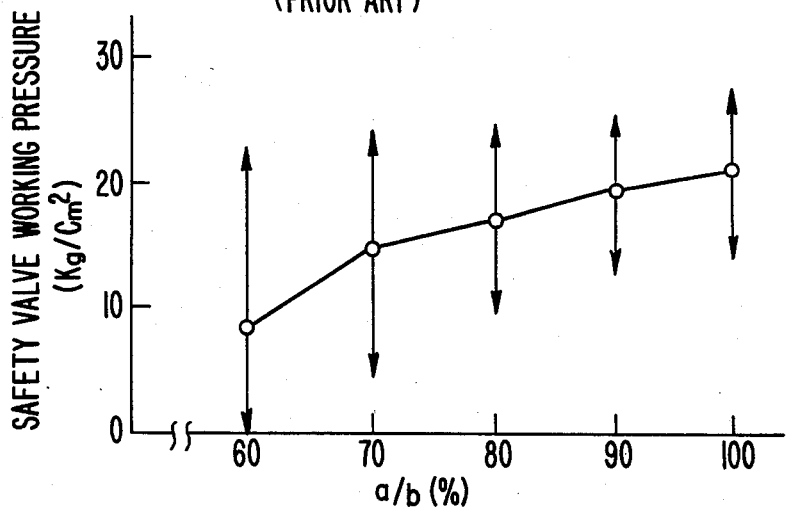
FIG. 4 is a characteristic diagram of the conventional safety valve device where the diameter of the elastic valve body is changed.

It is important for the safety valve device that the valve body be positioned in the middle of the valve chamber to reliably close the gas discharge hole. From this point of view, the conventional valve body shown in FIG. 2 is most suitable for the purpose. On the other hand, from the standpoint of decreasing said valve body occupancy percentage, it may be said that a valve body whose side surface in cross section is triangular is the best. When the disposition of the valve body in the middle of the valve chamber, the lowness of valve body occupancy percentage, and the stability of valve working pressure shown in FIG. 5 are considered, valve bodies whose shapes are from quadrangular to hexagonal are most stabilized. Of these, the most advantageous form from the standpoint of positioning the valve body in the middle of the valve chamber is a hexagon, which has many guide portions.

FIGS. 8A and 8B show a hexagonal valve body 4. The valve body 4 is made of chloroprene rubber, with the upper and lower surfaces being curved, the six angles which form guide portions being rounded with a radius of curvature of 1 mm to facilitate the insertion of the valve body into the valve chamber 3. In addition, instead of rounding the six angles, the peripheral edges may be chamfered with a width of about 0.5 mm, in which case also the insertion of the valve body 4 into the valve chamber 3 can be facilitated. The valve body occupancy percentage in this example is about 78% and the difference between the valve chamber inner diameter b and the circumscribed circle diameter a of the valve body is 0.1 mn, a/b being about 99%. The diameter a is substantially greater than the thickness (measured vertically in FIG. 8A) of the hexagonal valve body 4.

Figure 10:
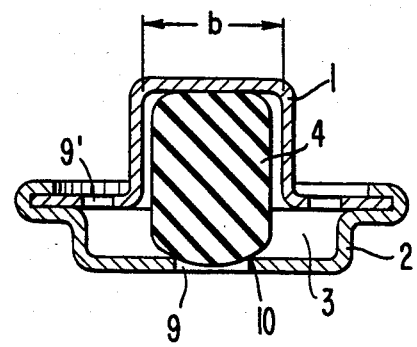
FIG. 10 is a sectional view showing another example of a safety valve device of the invention.
Figure 11A:
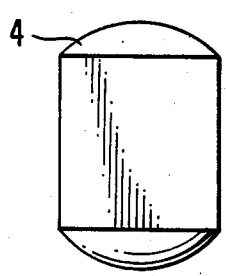
FIGS. 11A and 11B show an elastic valve body used in the safety valve device of FIG. 10, FIG. 11A being a front view, FIG. 11B being a top view.
Figure 11B:
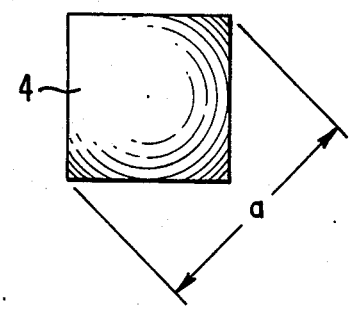

FIG. 10 shows a second embodiment of a safety valve device using an elastic valve body which is quadrangular when viewed from above the upper surface. FIGS. 11A and 11B are front end top views, respectively, of a quadrangular valve body 4 made of chloroprene rubber. The upper and lower surfaces are convexly curved to ensure close contact with the inner surface of the cap 1 and with the periphery of the gas discharge hole 9 formed in the middle of the dish type opening seal member 2. In the prepared embodiment shown in FIGS. 11A and 11B, the upper and lower surfaces are spherical or uniform in radius of curvature and bounded by the upper and lower edges of the side surfaces. The diameter a is substantially less than the thickness (measured vertically in FIG. 11A) of the quadrangular valve body 4.

In a valve body whose upper surface is quadrangular, if the ratio, a/b, between the circumscribed circle diameter a and the valve chamber inner diameter b is 100% or less, this would be disadvantageous as compared with the hexagonal valve body since positional deviation tends to occur in positioning the valve body in the middle of the valve chamber. In this example, however, a/b is 104%, the circumscribed circle diameter of the valve body being somewhat increased, so as to prevent occurrence of positional diviation. In addition, the four angles of the valve body are not chamfered and the upper and lower surfaces are curved, and the portion of the lower surface which contacts the gas discharge hole has a non-drying sealing agent 10 applied thereto, as in the preceding embodiment, so as to ensure satisfactory closure of the gas discharge hole. The valve body is pressure-fitted in the valve chamber 3 by crimping the peripheral edge of the opening seal member 2 around the flange of the cap 1 after the valve body has been inserted in the cap. The valve body occupancy percentage of the safety valve device shown in FIG. 10 is about 60%.

As has been described above, according to the present invention, an enclosed cell which produces less variation in the valve working pressure and which is superior in safety can be provided by making the valve body in the form of a polygon having not more than eight angles.

What is claimed is:

1. A sealed battery cell device, comprising:
   a cell container having an opening;
   a cell element stored in said container; and
   a safety valve device closing said opening, said safety valve device including
      a dish-type seal member closing said opening, said member having a central axis and a gas discharge hole centrally of said member extending along said axis,
      a cap-type positive terminal having an inner diameter b, fixed to said member along peripheral edges thereof, said terminal and said member defining a valve chamber having a circular cross section in a plane perpendicular to said axis, formed between central portions of said terminal and said member, said chamber communicating with the inside of said container through said gas discharge hole, and
      an elastic valve body in said chamber for closing said gas discharge hole, said body having a volume less than the volume of said chamber, a cross section in said plane in the shape of a polygon having an even number n of sides between 4 and 6, inclusive, first and second convex surfaces respectively facing said central portion of said terminal and said central portion of said member, and such dimensions as to be circumscribed by a circle in said plane of diameter a such that the ratio a/b is between 0.90 and 1.05.

2. A sealed battery cell device as in claim 1, wherein said number n of sides is equal to 4 and the thickness of body in the direction of said axis is greater than the diameter of said circle.

3. A sealed battery cell device as in claim 1, wherein said number n of sides is equal to 6 and the thickness of said body in the direction of said axis is less than the diameter of said circle.

4. A sealed battery cell device as in claim 1, wherein said body has a first and a second closed n-sided polygonal edge, respectively above and below said plane, said first and second convex surfaces being respectively bound by said first and second polygonal edges, each of said first and second convex surfaces having a uniform radius of curvature.

5. A device as set forth in claim 1, wherein the ratio of the volume of the elastic valve body to the volume of the valve chamber of the safety valve device in the range 40–85%.

6. A device as set forth in claim 1, wherein said terminal has a flange fixed by crimping thereover the peripheral edge of said member.

7. A device as set forth in claim 1, wherein the working pressure of said safety valve device is in the range 10–30 kg/cm$^2$.

8. A device as set forth in claim 3, wherein the ratio (a/b) is about 99%.

9. A device as set forth in claim 1, wherein said gas discharge hole has a burred shape and a water repelling non-drying sealing agent is applied to the region of contact between the periphery of said gas discharge hole and said valve body.

10. A safety valve device for enclosed cells as set forth in claim 3, wherein the peripheral edges of said valve body are chamfered.

11. A device as set forth in claim 3, wherein said valve body has edges between said sides which are rounded.

12. A device as set forth in claim 2, wherein the ratio (a/b) is 1.04.

13. A device as set forth in claim 2, wherein a water repelling non-drying sealing agent is applied to the region of contact between the periphery of said gas discharge hole and said second convex surface.

* * * * *